(12) United States Patent
Henze

(10) Patent No.: US 10,922,014 B1
(45) Date of Patent: Feb. 16, 2021

(54) DIE ACCESS ORDER VARIATION

(71) Applicant: Seagate Technology LLC, Cupertino, CA (US)

(72) Inventor: Jonathan Henze, Rochester, MN (US)

(73) Assignee: Seagate Technology LLC, Cupertino, CA (US)

( * ) Notice: Subject to any disclaimer, the term of this patent is extended or adjusted under 35 U.S.C. 154(b) by 70 days.

(21) Appl. No.: 15/997,768

(22) Filed: Jun. 5, 2018

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
USPC ...................... 714/43; 711/103, 12
See application file for complete search history.

(56) References Cited

U.S. PATENT DOCUMENTS

| | | | |
|---|---|---|---|
| 6,751,155 B2 | 6/2004 | Gorobets | |
| 7,669,086 B2 * | 2/2010 | Gower | G06F 9/52 714/43 |
| 8,447,920 B1 | 5/2013 | Syu | |
| 8,769,190 B1 | 7/2014 | Syu et al. | |
| 8,788,876 B2 * | 7/2014 | Jeddeloh | G06F 11/1028 714/6.2 |
| 9,507,704 B2 | 11/2016 | Tuers et al. | |
| 9,684,622 B2 | 6/2017 | King | |
| 9,817,593 B1 | 11/2017 | Inbar et al. | |
| 9,905,294 B1 | 2/2018 | Canepa et al. | |
| 2011/0058440 A1 * | 3/2011 | Smith | G06F 11/3034 365/229 |
| 2014/0185376 A1 | 7/2014 | Sinclair et al. | |
| 2014/0189205 A1 | 7/2014 | Sinclair et al. | |
| 2014/0189208 A1 | 7/2014 | Sinclair et al. | |
| 2016/0162186 A1 | 6/2016 | Kashyap et al. | |
| 2016/0292092 A1 | 10/2016 | Gavens et al. | |
| 2018/0121136 A1 * | 5/2018 | Ishiyama | G11C 8/12 |

\* cited by examiner

*Primary Examiner* — Mano Padmanabhan
*Assistant Examiner* — John Francis Wojton
(74) *Attorney, Agent, or Firm* — Kirk A. Cesari; Christian W. Best

(57) ABSTRACT

Systems and methods are disclosed for die access order variation to a memory having a multiple-die architecture. In certain embodiments, an apparatus may comprise a controller configured to assign a unique die access order to each set of multiple sets of related commands, a die access order controlling an order in which a plurality of dies of a solid state memory are accessed to perform the related commands. A first stream may be assigned a first die access order, and a second stream may be assigned a second, different die access order, thereby distributing the timing of die access collisions between the streams.

20 Claims, 5 Drawing Sheets

DIE ACCESS ORDER VARIATION

SUMMARY

In certain embodiments, an apparatus may comprise a solid state memory (SSM) having a multiple die architecture, and a controller. The controller may be configured to perform data accesses to the SSM based on streams of related data access operations. The controller may be configured to reduce an amount of simultaneous data access collisions to dies of the SSM, including determining a first stream of related data access operations to perform on a plurality of dies of the SSM, determining a stream die access counter indicating how many die have been accessed for the first stream, determining a modified die access order for the first stream that is distinct from die access orders of other streams at the controller, and performing the related data access operations of the first stream based on the modified die access order and the stream die access counter.

In certain embodiments, an apparatus may comprise a controller configured to assign a unique die access order to each set of multiple sets of related commands, a die access order controlling an order in which a plurality of dies of a solid state memory are accessed to perform the related commands.

In certain embodiments, an apparatus may comprise a data storage controller configured to perform data access operations to a solid state memory (SSM) having a multiple die architecture in a striped manner, so that each of a plurality of dies are accessed at a selected data storage location defining a stripe across the plurality of dies. The controller may be configured to determine a first stream including a first set of related commands of data access operations to perform on the SSM, and determine a second stream including a second set of related commands of data access operations to perform on the SSM. The controller may assign a first die access order to the first stream defining a sequence in which the plurality of die will be accessed to perform the first set of related commands, and assign a second die access order to the second stream, the second die access order being different from the first die access order to distribute a timing of data access collisions to a same die of the plurality of dies. The controller may be configured to execute the first stream according to the first die access order, and execute the second stream according to the second die access order concurrently with the first stream.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
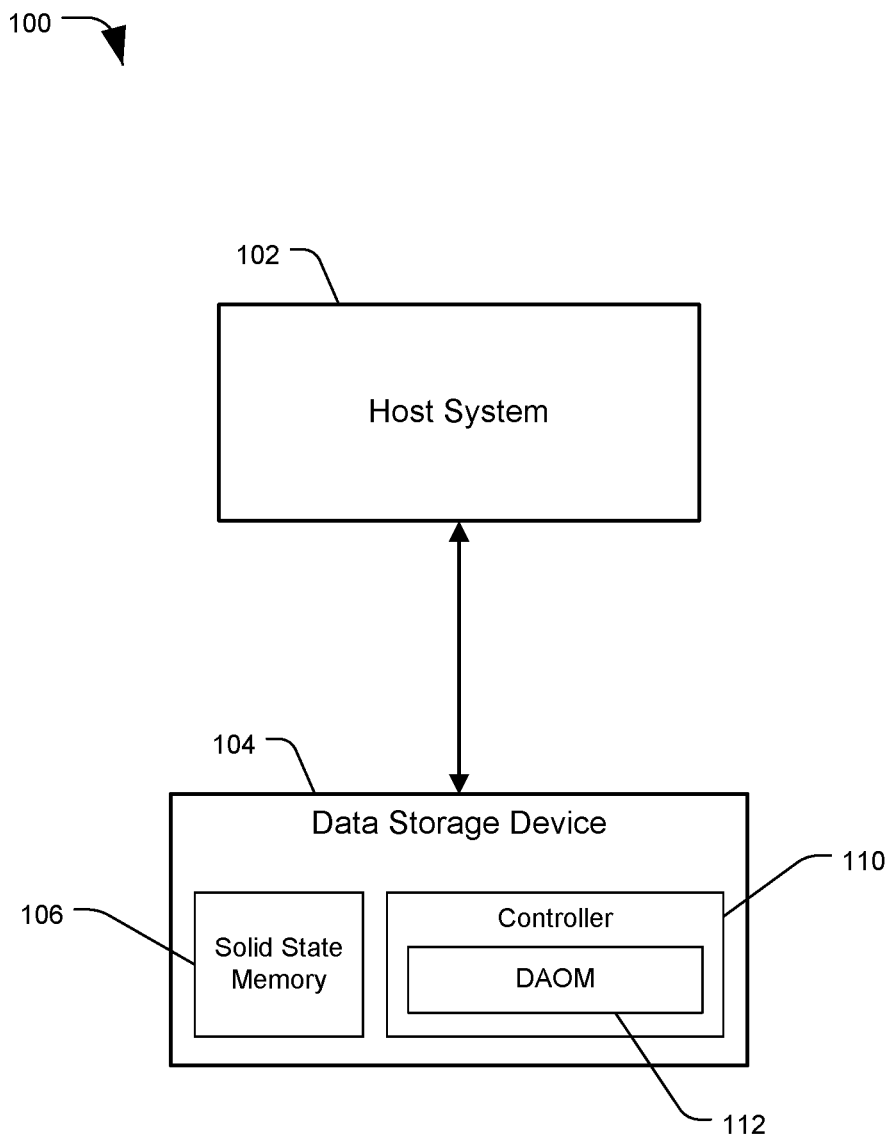
FIG. 1 is a diagram of a system configured to perform die access order variation, in accordance with certain embodiments of the present disclosure.

FIG. 1 is a diagram of a system, generally designated 100, configured to perform die access order variation, in accordance with certain embodiments of the present disclosure. The system 100 may include a data storage device (DSD) 104, such as a storage drive or any other device which may be used to store or retrieve data, including a solid state drive (SSD) or hybrid drive. As used herein, a data storage drive may refer to a device specifically adapted for data storage and retrieval to a memory internal to the drive, not including more general purpose processing devices such as computers and smart devices, although the DSD 104 and the teachings herein are not limited to such drives. The DSD 104 may include a memory 106 and a controller 110. The memory 106 may comprise one or more non-volatile memory (NVM) data storage mediums, such as solid state memory (sometimes referred to herein as SSM or NVSSM) including NAND flash memory, other types of memory, or a combination thereof. The controller 110 may be one or more processors or circuits configured to perform data access operations, such as reads or writes (also called program operations), to the memory 106. Data retrieved from the memory 106, or to be stored to the memory 106, may be processed via the controller 110, a read/write (R/W) channel, or other elements for encoding or decoding data, error correction, or other processing.

The system 100 may include a host device 102, which may also be referred to as the host system, host computer, or simply 'host'. The host 102 can be one or more server-class computers, desktop computers, laptop computers, workstations, tablet computers, telephones, music players, set top boxes, a control system of a self-driving vehicle, other electronic devices, or any combination thereof. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing). The host 102 may issue data access requests, such as read or write requests, to the DSD 104. In response, the DSD 104 may perform data access operations on the memory 106 via the controller 110 based on the requests.

As will be discussed in greater detail in regard to FIG. 2, some SSMs 106, such as NAND flash memory, may have a multiple die architecture made up of multiple flash die configured for storing data, and each die may contain one or more planes. Each plane may include multiple blocks for data storage, and each block may include multiple data storage units called pages. A die may be the smallest unit that can independently execute commands, although concurrent, generally identical operations can take place on each plane. For example, a single die having two planes may be able to execute two concurrent write operations, one on each plane. However, a die may not be able to concurrently execute a read and a write, nor two writes to blocks on a single plane. For the sake of simplicity, die will generally be discussed herein as having a single plane.

New data may be written in increments of pages (or in some embodiments, sub-pages). However, data may only be erased in increments of blocks. Data may also not be overwritten in place, and instead an entire block must be erased before already written pages can be written to again. Therefore, when data is updated in NAND memory, rather than overwriting the old data with the new data, the new data may be stored in a new location, and the old data may be left on the memory and marked as invalid. As used herein, invalid data is data that a drive no longer needs to retain, either because it has been replaced by a newer version of the same data, or because a host or other system has indicated that the data can be wiped. Valid data may refer to data that has not been rendered invalid by being replaced by a newer version of the data, or by a trim command or other operation indicating that the data is no longer needed and can be marked for erasure. The status of pages as valid or invalid may be tracked by the controller 110 and stored to a mapping table or other data structure, rather than being stored to the individual NAND memory pages themselves.

Over time, the memory 106 may fill up with a combination of valid and invalid data. In order to recover usable space, some DSDs 104 including some SSMs 106 will periodically perform garbage collection operations to free up storage space. During garbage collection, the DSD 104 may read the data from one or more blocks and write the valid data to a new location. Then the block can be erased, thereby freeing up space that was occupied by invalid data in the block. Often times blocks are grouped together in a garbage collection unit (GCU), so that all the blocks in the GCU are garbage collected and erased together. As described below, data may be "striped" across blocks from multiple dies, and a GCU may often include all blocks that are striped together (e.g. block 1 from each die) in order to keep related data together.

Some storage systems may be configured to store data to the dies of an SSM 106 in a striped manner. As discussed below for FIG. 2, data may be written across dies, so that a first page of a first block of each die is written before a second page of the first block of any die is written. In this manner, data may be "striped" across page 1 of block 1 of each die. In some of these systems, data may be written to dies in a preset order, such as starting with die 0 and proceeding through increasing-numbered dies until a last die N is written, and then returning to die 0. This may be considered a standard or normal write sequence or order.

Sometimes a series of writes may be segregated into separate streams. A stream may be a set of related data access operations or commands. Streams can be used to separate writes for user data from writes for system data, or to better separate data based on their properties related to garbage collection, for example. For example, commands from a host 102 may include identifiers or hints that indicate when data writes are associated with one another or have a similar expected lifetime. In some embodiments, all commands associated with data that is expected to be invalidated at the same time (e.g., updated, trimmed, unmapped, deallocated) may be assigned to the same stream, so that the data can be logically grouped together for moving or deletion from the SSM 106. Each stream may be assigned a stream identifier (ID), such as by the host 102, the controller 110, or based on some combination thereof. For example, the host 102 could assign different stream IDs to writes coming from different programs executing at the host, with the data from a same program being expected to have a similar lifespan. In another application, "hot" data that is frequently updated can be assigned a unique stream ID and the data for that stream ID may be striped together across dies of the SSM 106.

A DSD 104 may be processing and executing commands from multiple streams simultaneously, with data from the different streams being written to different blocks. Although these streams may be using different blocks, they may be sharing the same NAND dies. For example, stream 1 may be writing to block 1 of die 8, while stream 2 may be writing to block 2 of die 8. When a NAND die is busy performing commands for one stream (e.g. writes), that same die may not start executing commands from a different stream, and thus the second command must wait. When a command is sent to a die that is already busy performing another command, it may be called a "die collision" or "data access collision", resulting in one command having to wait for the completion of another command. That delay can cause the controller 110 to retain the data for the delayed command in its write buffer for a longer period of time. Additionally, when each stream is rotating through NAND dies in the same order (e.g. the 'standard' write or die access order described above) and there is a die collision, then there may be a high probability that the next die in order will also experience a die collision. Thus the controller 110 may experience a momentary blockage where all of the writes for one stream are blocked behind writes from another stream, and the backlog of writes may build up. This can cause resource shortages in the controller 110 where the controller 110 may temporarily run out of buffers, command tracking structures, or other resources, and can cause cascading delays of other commands. Large bursts or cascades of die collisions can cause delays which result in a poor quality of service from the DSD 104, such as slow command response times and failed (e.g. timed-out) commands. Adding additional buffer capacity may not address the slow response times and can add to the manufacturing cost of the DSD 104, such as from additional memory and larger capacitors to ensure all the buffered data is not lost in the event of a power failure.

Accordingly, system performance can be improved by reducing simultaneous die collisions, and thereby improving the quality of service provided by the DSD 104. As used herein, "simultaneous" or "simultaneously" may refer to operations or events that occur substantially simultaneously and are ongoing at the same time, even if those operations or events did not start at the same time. For example, simultaneous die collisions may refer to events in which a die that is already busy performing a command has another command sent to it, and then another command after that. This sequence of collisions may be considered simultaneous even though the commands were sent one at a time.

The controller may be configured to reduce an amount of simultaneous data access collisions to dies of the SSM by distributing a timing of the data access collisions. Rather than having a burst of collisions that can require increased resources and cause significant delays, the collisions can be spread out more evenly over time, so that minimal resources are required to handle the sporadic individual collisions. This improvement can be implemented by the inclusion of a die access order module (DAOM) 112 in the DSD 104. The DAOM 112 may be included within the storage controller 110, or situated elsewhere within the DSD 104.

The DAOM 112 may be configured to control an order in which different streams access the dies of the SSM 106 in order reduce or eliminate bursts of die collisions. The DAOM 112 may assign a distinct die access order to each stream such that even if a die collision occurs, the streams will diverge in their die access orders and not repeatedly encounter die collisions. The die access order may be implemented via calculations performed by the DAOM 112 to determine a next die to access for each stream, or by means of a lookup table (LUT) that identifies a die access sequence for a plurality of streams. In this manner, the problem of multiple simultaneous die collisions may be addressed and the performance of the DSD 104 may be improved. An example embodiment of system 100, including a more detailed diagram of DSD 104, is depicted in FIG. 2.

Figure 2:
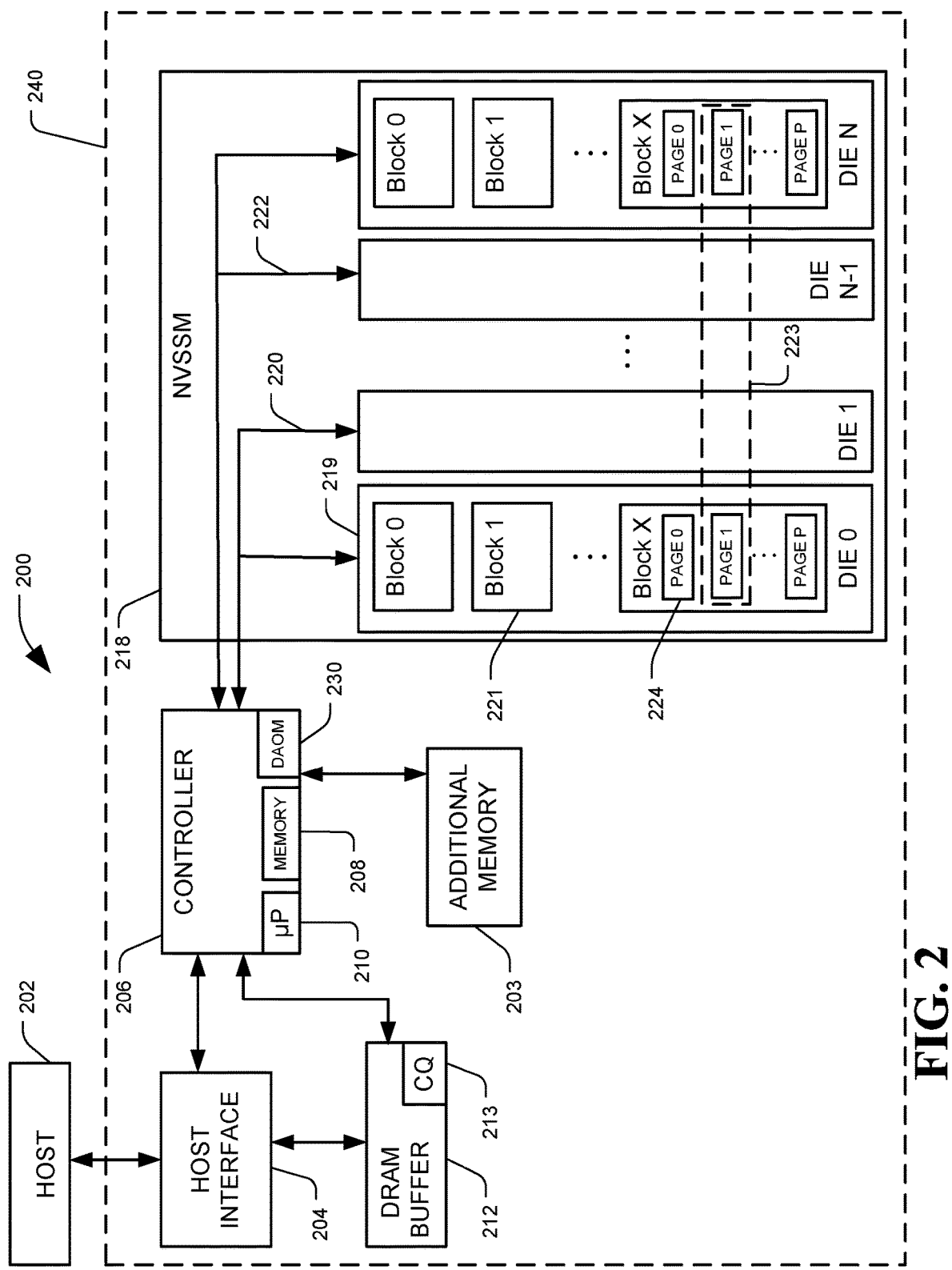
FIG. 2 is a diagram of a system configured to perform die access order variation, in accordance with certain embodiments of the present disclosure.

FIG. 2 is a diagram of a system, generally designated 200, configured to perform die access order variation, in accordance with certain embodiments of the present disclosure. Specifically, FIG. 2 provides a functional block diagram of an example data storage device (DSD) 200, which may be an example of the DSD 104 of FIG. 1. The DSD 200 may also be referred to as solid state drive (SSD) 200, according to some embodiments. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector that allows the DSD 200 to be physically removed from the host 202. The DSD 200 may have a casing 240 housing the components of the DSD 200.

The buffer 212 can be DRAM, SRAM, or other types of memory. The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. The controller 206 may control data access operations, such as reads, writes, and erases to one or more nonvolatile solid state memories (NVSSM) 218, such as NAND flash memory. The DSD 200 may include one or more additional memories 203 instead of or in addition to NVSSM 218. For example, additional memory 203 can be either volatile memory such as DRAM or SRAM, disc-based nonvolatile memories such as magnetic hard discs, other types of memory, or a combination thereof. The additional memory 203 can function as a working memory for storing generated parity data or other temporary information, a cache to store recently or frequently read or written data, or data likely to be read soon, or for other temporary data storage. Additional memory 203 may also function as main long-term storage instead of or in addition to NVSSM 218. A DSD 200 containing multiple types of nonvolatile storage mediums, such as a disc(s) and flash, may be referred to as a hybrid storage device.

The controller 206 may send and receive commands, data, and status information to and from the NVSSM 218 via one or more channels, such as channels 220 and 222. Channels 220 and 222 may each include one or more data busses used for executing data access operations to a set of dies of the NVSSM 218. The channels 220 and 222 may optionally also include other components used in data access operations to the NVSSM 218. For example, channels 220 and 222 may include components to encode data during write operations and decode user data retrieved from the NVSSM 218 during read operations, detectors to determine bit values, other components, or any combination thereof. In some architectures, the controller 206 may have sub-controllers for each channel 220, 222, which manage low-level details of operations to the multiple dies on its associated channel. The sub-controllers may optionally include encoders, decoders, or other elements for data access operations to dies on the respective channel 220 or 222.

The NVSSM 218 may include NAND flash memory, according to some embodiments. A NAND flash memory device may include a plurality of physical dies 219 (e.g. N+1 dies, from die 0 to die N) for storing data. Each die 219 may include one or more planes as described above, although for simplicity the figures depict an example employing single-plane dies 219. Each die (and each plane) may include a plurality of blocks 221 (e.g. block 0 to block X), which may be the smallest unit that can be erased in a NAND flash memory. A block 221 may store, e.g., 4-8 MB of data. Each block 221 may include a plurality of pages 224 (e.g. page 0 to page P), which may be the smallest unit of storage that can be programmed, or written to. An example page may store 8 or 16 KB of data. Write data received from the host 202 may therefore be written the NVSSM 218 one page 224 at a time. An example NAND die 219 may comprise multiple (for example, approximately 1000) NAND blocks 221, and within each NAND block 221 there may be multiple NAND pages (for example, approximately 512).

In some embodiments, data may be stored to the NVSSM 218 using a data striping approach. Rather than writing to one block 221 at a time, starting at page 0 and writing until the last page P is full before moving on to a next block, data may be written to a data stripe 223 that is striped across pages 224 of blocks 221 of multiple dies 219. An example data stripe may include one page 224 from a corresponding selected block 221 from each die 219. In the depicted embodiment, the data stripe 223 includes page 1 from block X of each die. In this manner, writing to a NVSSM 218 may begin by striping across page 0 of block 0 of each die, followed by a second stripe 223 across page 1 of block 0 of each die, through page P of block 0 of each die, and then moving on to page 0 of block 1 of each die, etc. In some architectures, there may be multiple sets of dies, so that striping is performed across all dies in a set, rather than all dies in the entire NVSSM 218. In some architectures the stripe 223 can include different block numbers from each die. So for example a stripe 223 may include block X from die 0 along with block Y from die 1, and block Z from die 2, etc. For the sake of simplicity in description, however, the presumption in the descriptions provided herein may be that a corresponding block from each die is used in a stripe 223. Blocks that are associated for the purposes of striping may also be grouped together to form a garbage collection unit (GCU) for garbage collection purposes, to keep related streamed data together, or to garbage collect those blocks all at once if a group of streamed data is invalidated. So if data is striped across block 0 of each die 219, then block 0 from each die 219 may comprise a garbage collection unit.

Multiple blocks may be logically grouped together for the purposes of garbage collection into a garbage collection unit (GCU). When garbage collection is to be performed, the SSD 200 may select a GCU for garbage collection, and then garbage collect all the blocks in that GCU. In some embodiments, a corresponding block from each die (e.g. Block 0 from each die) may comprise a GCU, so that there may be a same number of GCUs in the NVSSM 218 as there are blocks 221 on a die 219 (although a GCU may comprise two or more blocks 221 from each die 219 in a set of die as well). Grouping the blocks 221 in this manner may be helpful in systems employing striped writing, so that the striped data is generally kept together by garbage collecting matching blocks together.

Using the striped data writing approach and a "standard" write order, writing may start at die 0, then die 1, and continue on through die N. In some embodiments, writing may be performed partially or wholly in parallel. For example, before a write to die 0 has completed, the system may begin a write to die 1, and possibly dies 2 and 3 as well. If multiple streams of writes (or other data access operations) are being processed simultaneously, stream 1 may occupy dies 0, 1, and 2 with writes, causing die collisions where writes from stream 2 are buffered waiting for dies 0, 1, and 2 to become available. If another stream, stream 3, is also pending but has already written die 0, it may need to buffer writes for dies 1 and 2 as well, and then begin writing to die 3. Stream 1 may then receive another write and need to access die 3 as well, and likewise need to be buffered. In this manner, die collisions can add up, causing slow response times and requiring large amounts of buffer space to store pending writes. Meanwhile, later dies such as die N−1 and die N may be idle.

In order to avoid such build-ups of die collisions, the DSD 200 may include a die access order module (DAOM) 230. The DAOM 230 may be integrated into or executed by the storage controller 206, a circuit or module separate from the controller 206, or otherwise executed by or located within the DSD 200. The DAOM 230 may determine a distinct die access order for each stream pending at the DSD 200. Rather than every stream following the same or a "standard" die access order to stripe data across dies, each stream may be assigned its own distinct order in which to access the dies. Instead of multiple streams attempting to access the same dies, resulting in build ups of die collisions, buffered data, and slow command completion, different streams will be accessing the dies in a different order, significantly reducing the maximum number of simultaneous die collisions, slowed command completion, and the need for buffering. The buffer space can instead be put to different use, or less buffer capacity may be included in the DSD 200 compared to drives that do not include die access order variation, reducing the cost of the DSD 200.

The die access order for each stream may be determined in a number of ways. Each stream may be assigned a die access order modifier that can be used by the DAOM 230 to determine a sequence of dies for the associated stream. The die access order modifier may be a unique multiplier value or other distinct value that can be used in an equation to calculate a next die to access on the fly. In another example, the die access order modifier may be a stream number or identifier used as an input to access a lookup table (LUT) of die access sequences, so that the table outputs a different die access sequence for each stream. Other embodiments are also possible.

An example embodiment may include assigning a multiplier value to each stream, and using that multiplier do determine a die access order for the stream. First, each of the NAND dies 219 in a stripe 223 may be assigned a logical die number (logicalDie) that counts from 0 to N, where N is equal to a total number of dies in the stripe (numDies) minus 1. Next, each stream may be assigned a distinct or unique (e.g. different for each stream currently pending at the DSD 200) die multiplier value (streamDieMultiplier). It may be advantageous to select streamDieMultiplier values that are co-prime with numDies (e.g. the only positive integer (factor) that divides both numDies and streamDieMultiplier is 1), and that are different for each stream. A die access counter (streamDie) may also be maintained for each die, which may indicating how many die have been accessed for the current stripe of the corresponding stream. Therefore streamDie should count from 0 to numDies—1, with 0 indicating no data has been stored to any dies yet for the current stripe of that stream, and numDies—1 meaning data for that stream has filled the entire current data stripe (assuming the data stripe includes one page per die, for example). Values for streamDieMultiplier and streamDie may be stored to a data structure for the corresponding stream, such as in memory 208 of controller 206.

Using modular multiplication, the following equation can determine which logicalDie should be written next as streamDie is incremented from 0 to numDies minus 1:

$$\text{logicalDie} = (\text{streamDie} * \text{streamDieMultiplier}) \text{ modulo numDies} \quad \text{Eq. 1:}$$

The modulo operator may also be expressed as 'mod' or the percentage symbol (%). The modulo operation, or modular multiplication, produces a result that is the remainder after division of the two inputs. So for example, 13 mod 3 may produce a result of 1, since 13 divided by 3 is 4, with a remainder of 1. Similarly, 10 mod 3, 16 mod 3, and 19 mod 3 all produce a result of 1.

So long as streamDieMultiplier is co-prime to numDies, as streamDie counts from 0 to numDies minus 1, the output of equation 1 will touch every logicalDie at some point in the sequence. However, different streamDieMultipliers will result in those logicalDie values being output in different orders, so that different streams will access the dies in distinct sequences. The streamDieMultiplier values may be preset by a manufacturer and stored to a memory of the DSD 200, or may be calculated by the DSD 200 based on a number of dies in the device. The DSD 200 may be configured to process up to a certain number of streams simultaneously, and thus a preset number of streamDieMultiplier values equal to the maximum number of streams can be determined and stored. The streamDieMultipliers can be assigned and unassigned as new streams are received and existing streams are terminated.

The modular multiplicative inverse of streamDieMultiplier can be calculated to allow conversions from logical die numbers back into stream die numbers with the following equation:

$$\text{streamDie} = (\text{logicalDie} * \text{streamDieMultiplierInverse}) \text{ modulo numDies} \quad \text{Eq. 2:}$$

Equation 2 may be used to determine at what point in the streamDie sequence a given logical die was written by a stream. As the streams do not write to the die in an ascending logical order, being able to determine the point in the stream a given logical die was written may be advantageous in certain use cases. A set of streamDieMultiplier and the corresponding streamDieMultiplierInverse values may be related values that are both assigned together to the same stream.

In an example embodiment, consider a DSD 200 in which numDies=16. A first stream may be assigned a streamDieMultiplier=11 and streamDieMultiplierInverse=35 to yield the following program order sequence for one stream:
stream die 0→Eq. 1=(0*11) % 16=logical die 0
stream die 1→(1*11) % 16=logical die 11
stream die 2→(2*11) % 16=logical die 6
stream die 3→logical die 1
stream die 4→logical die 12
stream die 5→logical die 7
stream die 6→logical die 2
stream die 7→logical die 13
stream die 8→logical die 8
stream die 9→logical die 3
stream die 10→logical die 14
stream die 11→logical die 9
stream die 12→logical die 4
stream die 13→logical die 15
stream die 14→logical die 10
stream die 15→logical die 5

It can be seen that every die, from logical die 0 to logical die 15, it accessed once as streamDie increments from 0 to 15, but in a non-sequential order. Similarly, using a given logical die value and the streamDieMultiplierInverse, the corresponding stream die value can be computed for any of the accesses above using equation 2.

When the value of streamDie=numDies−1 for equation 1, all dies in a stripe may have been accessed, and the stream may be assigned to a next stripe. The streamDie value can either be reset to 0, or continue to increment beyond numDies-1, and equation 1 will result in continuing to loop through the logical die access order shown above. For example, for streamDie=16, (16*11) % 16=0, restarting the die access order at the first location of the next stripe.

Meanwhile a second stream may be assigned a streamDieMultiplier=13 and streamDieMultiplierInverse=69 to yield the following sequence:
stream die 0→logical die 0
stream die 1→logical die 13
stream die 2→logical die 10
stream die 3→logical die 7
stream die 4→logical die 4
stream die 5→logical die 1
stream die 6→logical die 14
stream die 7→logical die 11
stream die 8→logical die 8
stream die 9→logical die 5
stream die 10→logical die 2
stream die 11→logical die 15
stream die 12→logical die 12
stream die 13→logical die 9
stream die 14→logical die 6
stream die 15→logical die 3

It can be seen that stream 2 will similarly access every die within the stripe, but in a different order from stream 1.

A third stream could even use streamDieMultiplier=1 and streamDieMultiplierInverse=1, to produce a sequence in which stream die X directly maps to logical die X, therefore following the "standard" write order. This may be an acceptable approach for one stream, as long as other streams concurrently processing at the DSD 200 are assigned different streamDieMultiplier values to avoid or reduce die collisions.

When all three of these example streams are writing at the same time they may still occasionally encounter collisions (e.g. with two streams attempting to access die 0 simultaneously), but in cases when two streams collide on the same logical die they will then proceed to different logical dies next, and should avoid future collisions for a time. This can prevent a scenario where many simultaneous collisions are encountered, causing one or more streams to stall.

The three (streamDieMultiplier, streamDieMultiplierInverse) pairs provided above can work for any numDies that is a power of 2 up to and including 128. Appropriate streamDieMultiplier values can be pre-calculated during manufacturing on a per drive configuration basis according to the number of dies in a stripe and the maximum number of streams. For example, if DSD 200 is configured to handle sixteen simultaneous streams, then sixteen streamDieMultipliers may be stored to the DSD. Some DSD may be configured to swap out idle streams and swap in active streams in order to receive more streams than it can currently process, in which case it may be advantageous to have sufficient streamDieMultipliers for all streams, both active and inactive. In some embodiments, the DAOM 230 may be configured to generate streamDieMultiplier values during runtime, and optionally streamDieMultiplierInverse values.

The die access order variation described herein is not limited to write streams. For example, a similar die collision problem can arise with regard to erases colliding with writes or other erases. As erases may be performed to a plurality of blocks of a garbage collection unit (GCU) that spans multiple dies, then there may be a series of erase operations to erase each block of the GCU. In another example, background system operations may write to blocks for, e.g. error testing, and then those blocks may be erased in a process separate from garbage collection. A series of erase operations may be assigned a streamDieMultiplier by the DAOM 230 as well, and treated as a stream for the purposes of die access ordering. Accordingly a number of streamDieMultipliers stored to the DSD 200 may be the total number of write streams plus a number of erase streams that may be handled simultaneously by the DSD 200.

An example method to calculate a streamDieMultiplier for any arbitrary number of dies may be to choose a prime number that is larger than numDies and different for every streamDieMultiplier. This should always provide a sequence that touches every die because a prime number larger than numDies will always be coprime with numDies. However, it is not required to select a streamDieMultiplier value in this manner, so long as the selected streamDieMultiplier values assigned to the streams create sufficient die access variability to significantly reduce die collisions. For example, the streamDieMultiplier examples of 1, 11, and 13 provided above are not values greater than numDies, which was 16. Similarly, it is not necessary for each of the streamDieMultiplier values to be prime numbers.

The streamDieMultiplier values may also be selected to account for channel collisions as well. Each channel 220 and 222 may be used to transfer data to and from a plurality of dies. However, each channel 220 and 222 may not be able to handle multiple different data transfers simultaneously. If a data transmission cannot be sent along a channel because the channel is already busy with another die, it may be called a channel collision, and may require the data transmission to be delayed. Depending on how the dies on each of channels 220 and 222 are laid out in the logical die ordering, the streamDieMultipliers can be chosen such that when two streams collide on a die 219, they will not only go to different dies next but they will also go to different channels next to avoid a potential channel collision. The example streamDieMultipliers provided above of 1, 11, and 13 would avoid channel collisions for many systems where:

the channel to access next=logicalDie modulo [number of channels].     Eq. 3:

For the example above, this would mean that for 16 dies on 8 channels, the dies would be distributed between the channels so that channel 0=dies 0 and 8; channel 1=dies 1 and 9; channel 2=dies 2 and 10, etc. For example, for:
streamDieMultiplier=1
   stream die 0→logical die 0→(logical die 0% 8)=channel 0
   stream die 1→logical die 1→channel 1
   stream die 2→logical die 2→channel 2
   . . .
   stream die 14=logical die 14→channel 6
   stream die 15=logical die 15→channel 7
   streamDieMultiplier=11
stream die 0→logical die 0→channel 0
   stream die 1→logical die 11→channel 3
   stream die 2→logical die 6→channel 6
   . . .
   stream die 14→logical die 10→channel 2
   stream die 15→logical die 5→channel 5
streamDieMultiplier=13
   stream die 0→logical die 0→channel 0
   stream die 1→logical die 13→channel 5
   stream die 2→logical die 10→channel 2
   . . .
   stream die 14→logical die 6→channel 6
   stream die 15→logical die 3→channel 3

As can be seen, even if there is an initial die collision at die 0, the first stream will next access channel 1, the second stream will access channel 3, and the third stream will access channel 5, thereby avoiding channel collisions. This formula of equation 3 may not avoid channel collisions for all systems, however, as a system with a single channel, or with two channels when numDies is even.

When a stripe has less dies than the maximum numDies that the streamDieMultiplier was calculated for (for example, due to defects) the missing logical die(s) can simply be skipped when they come up in the streamDie ordering, with the write intended for the skipped die being directed to the next calculated logical die in the stripe. It is not necessary to calculate a new set of streamDieMultipliers for the reduced stripe size.

An example method of selecting a corresponding streamDieMultiplierInverse to go with a streamDieMultiplier may include selecting a value that is co-prime to numDies and satisfies the following equation:

(streamDieMultiplier*streamDieMultiplierInvers) modulo numDies=1     Eq. 4:

Using modular multiplication to generate the different die ordering per stream may be convenient in firmware because there may be a low memory requirement in only needing to save the multiplier and optionally the inverse. However, the modulo instruction can add computational overhead, for example when it cannot be guaranteed that the stripe size will be a power of 2. It may be desirable to precompute all the streamDie to logicalDie translations and store the result in a table, rather than having the translation computation be performed on the fly. If a table is going to be used, it could be calculated using any method to generate the ordering. For example, start with an ordered list and randomly swap values around until the list has been sufficiently shuffled. An example implementation using a table to determine the die access order will be explained in regard to FIG. 3.

Figure 3:
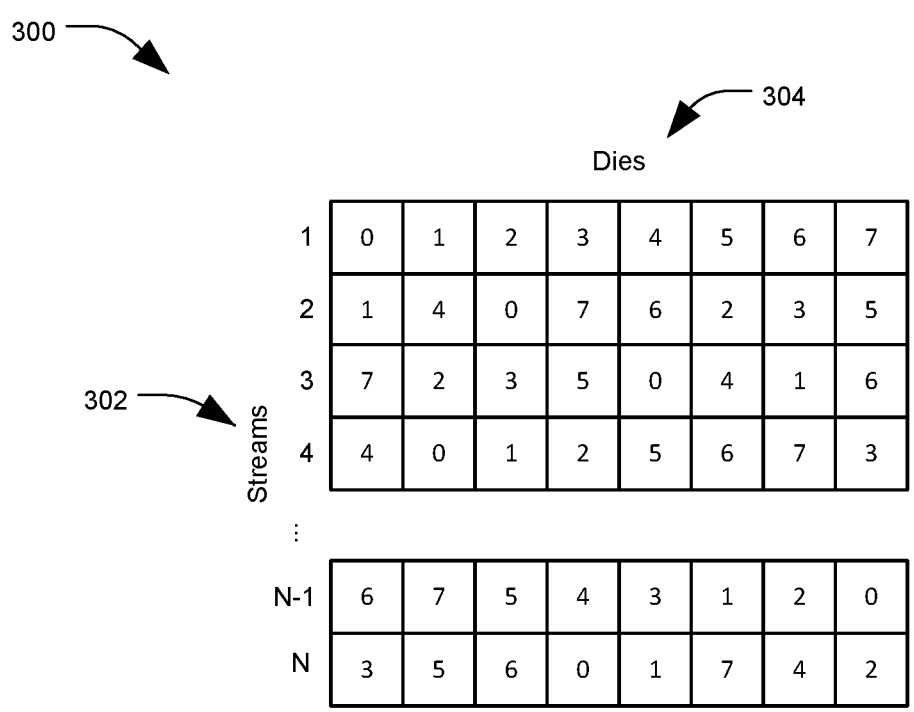
FIG. 3 is a diagram of a lookup table for performing die access order variation, in accordance with certain embodiments of the present disclosure.

FIG. 3 is a diagram of a lookup table (LUT) 300 for performing die access order variation, in accordance with certain embodiments of the present disclosure. The LUT 300 may be maintained by the die access order module (DAOM) 230 or the controller 206 of FIG. 2. The table may be retrieved from a nonvolatile memory and loaded into a temporary memory during device operation, such as DRAM buffer 212 and controller memory 208. The DAOM 230 may access the LUT 300 to determine an order in which to access dies of a stripe for a selected stream of data access operations. The example LUT 300 is depicted as a grid-based table, but the information described herein can be stored in a number of formats or data structures.

In the depicted example, the LUT may include a plurality of rows corresponding to stream numbers or identifiers 302, numbered from 1 to N, each of which may correspond to a die access order. The die access order for each row may be represented as a distinct or unique sequence of logical die indicators or addresses 304.

Each stream being processed at a storage device may be assigned a stream number, which may be used to determine the order in which to access the dies of a stripe for that stream. A counter (such as the streamDie value discussed above) may be stored for each stream to know which column (and accordingly which logical die) to access next for that stream. In this manner, the stream number 302 and the stream die access counter may be used as inputs to retrieve an indicator of the next die 304 to access from the LUT 300.

In some embodiments, the number of stream numbers N may be a number of streams of related data access operations (e.g. writes and erases) the storage device is configured to process simultaneously, but this is not required. Multiple streams may be assigned to the same stream number 302, provided there are enough distinct die access orders to create substantial variation in the die access orders for the streams and reduce simultaneous die collisions. For example, assume a storage device is configured to process up to thirty-two simultaneous write streams, and up to four erase streams, resulting in up to thirty-six simultaneous streams. Each stream may be assigned a stream number 302 in order to determine a die access order 304 from the LUT 300. However, the LUT 300 may only include, e.g., sixteen different stream numbers 302. The first sixteen streams may be assigned to stream numbers 1 through 16 in order, while the seventeenth stream may be assigned to stream number 1 again. Stream one and stream seventeen may at some point experience a cascade of collisions if the streams are moving at different speeds (e.g. receiving associated write operations at a different rate). However, having a few sets of streams occasionally experience cascade collisions may still provide significant performance improvements over a system having thirty-six streams use the same die access order and produce cascading die collisions.

As stated above, any method may be used to select the die 304 access orders for each stream number 302, such as by using calculations like those provided herein, by randomizing the die values, or by specifically selecting optimal die sequences. For example, the die access orders could be selected as described above to avoid channel collisions after a die collision occurs. Example methods of applying die access order variation are described in regards to the following flowcharts.

Figure 4:
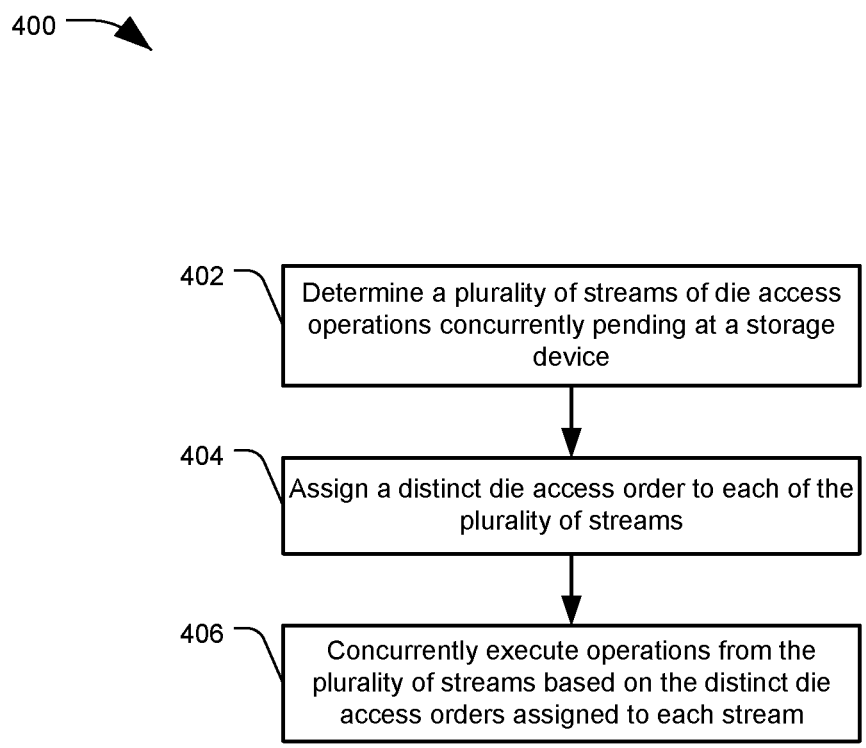
FIG. 4 is a flowchart of an example method of die access order variation, in accordance with certain embodiments of the present disclosure.

FIG. 4 is a flowchart of an example method 400 of die access order variation, in accordance with certain embodiments of the present disclosure. The method 400 may be performed by a data storage device (DSD) having a multiple die solid state memory architecture, for example via a storage controller, die access order module (DAOM), other components, or any combination thereof.

The method 400 may include determining a plurality of streams of die access operations concurrently pending at a storage device, at 402. For example, streams may include sets of related data access commands from various sources, such as streams of writes from a host, as well as internal operations of the storage device such as storing system data or performing garbage collection erase operations. The plurality of streams may be a maximum number of streams a device can concurrently process, or it may be a subset of the maximum number. For example, a device may be able to handle up to thirty-two distinct streams, which may be logically divided into two sixteen-stream pluralities of streams.

The method 400 may include assigning a distinct or unique die access order to each of the plurality of streams, at 404. The die access order may be assigned to a stream in the form of a multiplier value that can create variation in a die access sequence, a stream number used to access a LUT for determining a die access sequence, or any other indicator or value that would create die access order variation between streams. The die access order may be distinct or unique among streams in the selected plurality of streams, but may not be distinct among other pluralities of streams at the storage device. For example, the device may be configured to assign up to sixteen distinct die access orders, and manage two pluralities of up to sixteen streams each.

At 406, the method 400 may include concurrently executing operations from the plurality of streams based on the distinct die access orders assigned to each stream. The device may use a lookup table, perform equations, or otherwise determine a next die to access for each stream, with the distinct die access orders significantly reducing or eliminating die collisions between active streams.

Figure 5:
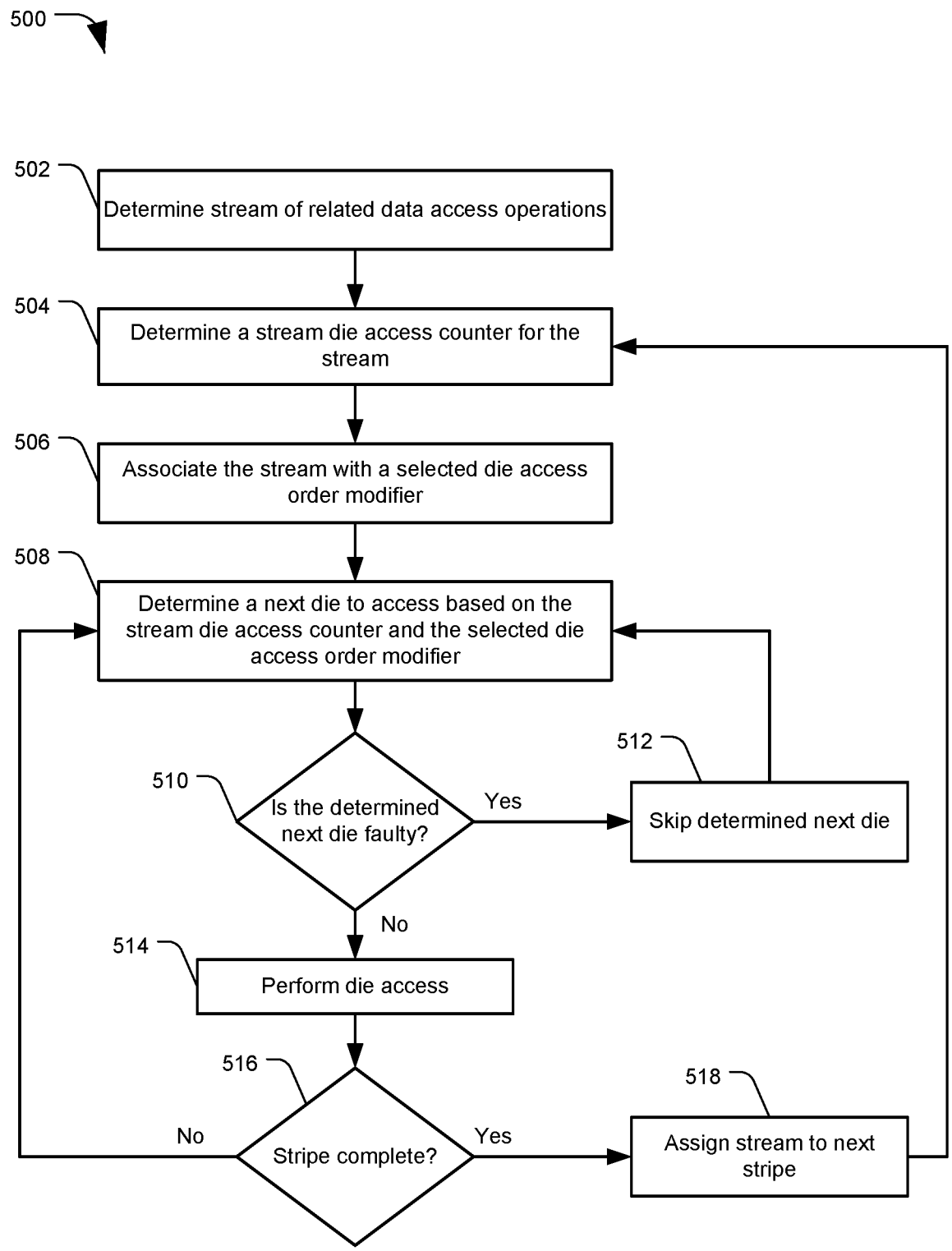
FIG. 5 is a flowchart of an example method of die access order variation, in accordance with certain embodiments of the present disclosure.

FIG. 5 is a flowchart of an example method of die access order variation, in accordance with certain embodiments of the present disclosure. The method 500 may be performed by a data storage device (DSD) having a multiple die solid state memory architecture, for example via a storage controller, die access order module (DAOM), other components, or any combination thereof.

The method 500 may include determining a stream of related data access operations, at 502. A stream die access counter may be determined for the stream, at 504, which may correspond to the streamDie value described above. The stream die access counter may indicate how many die have been accessed for the stream. As an example, the counter may start at 0 and count up to the number of dies in a write stripe minus 1. Once the stream die counter reaches the number of dies in a stripe minus 1, then all the dies for the current stripe may have been written to, erased, or otherwise accessed by the stream.

At 506, the method 500 may include associating the stream with a selected die access order modifier. The die access order modifier may be a multiplier value which can be used to calculate a die access order, it may be a stream number used to access a lookup table (LUT), or may be another identifier or value which can be used to set a die access order for the stream.

The method 500 may include determining a next die to access for the stream based on the stream die access counter and the selected die access order modifier, at 508. For example, equation 1 provided above can be applied based on the stream die counter and a stream die multiplier, in a modular multiplication operation with the number of dies in a stripe to calculate a next die to access and the overall die access order. In another example, a stream number and the stream die access counter can be used to retrieve an indicator from an LUT for the next die to access.

A determination may be made whether the next die to access is faulty or otherwise unable to be written, at 510. For example, the target page or block of the next die to be written may have been marked as unreliable due to wear, and therefore the system may avoid storing data to that location. If the next die is unavailable, the method 500 may include skipping the determined next die, at 512, and instead locating the next die in the die access sequence, at 508. For example, if the stream is a sequence of erase operations, the faulty die may not need to be erased and the stream can proceed to a next die in line. If the stream is a sequence of writes, the data intended for the faulty die may instead be written to the next working die according to the determined die access order.

If the determined next die is not faulty, at 510, the method 500 may include accessing the die, at 514. Once the die access has been initiated, the method 500 may include determining if the entire stripe has been accessed, at 516. For example, if the stream die access counter has reached a value equal to a number of dies in a stripe, the stripe may have been fully accessed. If not, there may be more dies yet to access in the current stripe. If the stripe is not complete, at 516, the method 500 may include determining a next die to access, at 508. If the stripe has been completed, the method 500 may include assigning the stream to a next stripe, at 518, and then determining or resetting the stream die access counter for the stream, at 504. Some streams may complete and terminate after completing a stripe, such as erase operations which may erase each block in a stripe and then terminate. A write stream, on the other hand, may continue through multiple data stripes, and may remain open awaiting new host data.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a solid state memory (SSM) having a multiple die architecture;
a controller configured to:
perform data accesses to the SSM based on streams of related data access operations, a stream including operations directed to data having similar expected valid lifespans;
reduce an amount of simultaneous data access collisions to dies of the SSM, including:
determine a first stream of related data access operations to perform on a plurality of dies of the SSM;
determine a stream die access counter indicating how many die have been accessed by operations of the first stream;
determine a modified die access order for the first stream that is distinct from die access orders of other streams at the controller; and
perform the related data access operations of the first stream based on the modified die access order and the stream die access counter.

2. The apparatus of claim 1 further comprising:
the streams of related data access operations include program operations directing the controller to store data to the SSM; and
the controller is further configured to store data from the streams of related data access operations to the plurality of dies in a striped manner, so that a portion of the data from a stream is stored to each die in the plurality of dies.

3. The apparatus of claim 2 comprising the controller further configured to:
associate the first stream with a first selected die access order modifier; and
determine a next die to access according to the modified die access order based on the first selected die access order modifier and the stream die access counter.

4. The apparatus of claim 3 further comprising:
the plurality of dies are connected to the controller by way of multiple data channels, each data channel used to access a distinct set of dies from the plurality of dies;
the controller further configured to:
determine a second stream of related data access operations to perform on the plurality of dies of the SSM;
associate the second stream with a second selected die access order modifier that is different from the first selected die access order modifier, resulting in a second modified die access order distinct to the second stream; and
the first selected die access order modifier and the second selected die access order modifier are configured so that, when a data access collision to a same die occurs between the first stream and the second stream, the first stream and the second stream will next access different dies on different data channels.

5. The apparatus of claim 3 further comprising:
the selected die access order modifier is a numerical value that is distinct to the first stream out of other streams of related data access operations pending at the controller;
the controller further configured to determine the next die to access based on a modulo operation, in which the product of the stream die access counter and the die access order modifier is divided by a number of dies in the plurality of dies, with a remainder of the division being a number of the next die to access.

6. The apparatus of claim 3 further comprising:
the selected die access order modifier includes a stream number assigned to the first stream;
the controller further configured to determine the next die to access based on a lookup table, with the stream number and the stream die access counter used as inputs to retrieve an indicator of the next die to access from the lookup table.

7. The apparatus of claim 3 further comprising:
the streams of related data access operations include erase operations directing the controller to erase data from blocks of the plurality of dies; and
the controller is further configured to associate distinct die access order modifiers with each stream being concurrently processed at the controller, for both program streams and erase streams, to reduce the data access collisions.

8. The apparatus of claim 3 comprising the controller further configured to:
determine whether the next die to access is inoperable;
when the next die to access is inoperable:
determine a following die to access according to the modified die access order; and
skip performing a data access to the next die to access and instead perform the data access to the following die.

9. The apparatus of claim 1 further comprising:
an interface configured to receive commands from a host device;
the streams of related data access operations include collections of host commands, with host commands assigned to different streams based on identifiers received from the host which designate certain commands as related.

10. An apparatus comprising:
a controller of a data storage device, the controller configured to:
assign a distinct die access order to different sets of related commands,
the commands in a set of related commands are related based on being directed to data having similar expected lifespans; and
the die access order controls a sequence in which each set of related commands accesses a plurality of dies of a solid state memory to perform the related commands.

11. The apparatus of claim 10 further comprising:
the distinct die access orders are configured to reduce data access collisions to a same die from the plurality of dies by the different sets of related commands, a data access collision occurring when two commands attempt to simultaneously access a same die that can only handle a single data access at a time.

12. The apparatus of claim 11 further comprising:
the solid state memory;
multiple data channels, each data channel used to access a distinct set of dies from the plurality of dies; and
the distinct die access orders are configured to send a subsequent commands from each of a plurality of sets of related commands to dies on different data channels following a data access collision by commands from the plurality of sets of related commands.

13. The apparatus of claim 10 comprising the controller further configured to:
store data across the plurality of dies in a write stripe that includes a storage location from each of the plurality of dies;

assign distinct die multiplier values to the different sets of related commands; and determine a die access order for a first set of related commands based on the die multiplier value assigned to the first set of related commands and a number of dies included in the write stripe.

14. The apparatus of claim 13 comprising the controller further configured to:

maintain a stream die access counter for each set of related commands indicating how many die have been accessed for the corresponding set of related commands;

determine a next die to access based on a modulo operation, in which the product of the stream die access counter and the die multiplier value is divided by a number of dies in the plurality of dies, with a remainder of the division being a number of the next die to access.

15. The apparatus of claim 10 comprising the controller further configured to:

maintain a table including a plurality of die access orders;

assign a first set of related commands to a selected die access order from the table; and access dies for commands from the first set of related commands in an order dictated by the selected die access order.

16. An apparatus comprising:

a data storage controller configured to:

perform data access operations to a solid state memory (SSM) having a multiple die architecture in a striped manner, so that each of a plurality of dies are accessed at a selected data storage location defining a stripe across the plurality of dies;

determine a first stream including a first set of related commands of data access operations to perform on the SSM, a stream including operations directed to data having similar expected valid lifespans;

determine a second stream including a second set of related commands of data access operations to perform on the SSM;

assign a first die access order to the first stream defining a sequence in which the plurality of die will be accessed to perform the first set of related commands;

assign a second die access order to the second stream, the second die access order being different from the first die access order to distribute a timing of data access collisions to a same die of the plurality of dies;

execute the first stream according to the first die access order; and execute the second stream according to the second die access order and before the first stream has finished executing.

17. The apparatus of claim 16 comprising the data storage controller further configured to:

assign distinct die multiplier values to each stream, wherein a die access order for each stream is determined based on the distinct die multiplier value, a stream die access counter indicating how many die have been accessed for the stream, and a number of dies in the plurality of dies.

18. The apparatus of claim 16 comprising the data storage controller further configured to:

maintain a table including a plurality of distinct die access orders, including the first die access order and the second die access order;

assign each stream to a distinct die access order from the table; and access dies for each stream in an order dictated by the selected die access order.

19. The apparatus of claim 16 further comprising:

the SSM;

a host interface to receive commands for data access operations, wherein the commands from the host include identifiers indicating which stream the command should be added to; and the data storage controller further configured to assign commands to a stream based on the identifiers.

20. The apparatus of claim 16 further comprising:

the first stream includes a series of data storage operations directing the data storage controller to store data in the striped manner to the plurality of dies; and the second stream includes a series of erase operations directing the data storage controller to erase data stored in the striped manner from the plurality of dies.

* * * * *